(12) United States Patent  
Hoffmann

(10) Patent No.: US 9,311,595 B1  
(45) Date of Patent: Apr. 12, 2016

(54) NEURAL NETWORK DEVICE WITH ENGINEERED DELAYS FOR PATTERN STORAGE AND MATCHING

(71) Applicant: HRL Laboratories, LLC, Malibu, CA (US)

(72) Inventor: Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/333,939

(22) Filed: Jul. 17, 2014

Related U.S. Application Data

(62) Division of application No. 13/358,095, filed on Jan. 25, 2012, now Pat. No. 8,818,923.

(60) Provisional application No. 61/501,636, filed on Jun. 27, 2011.

(51) Int. Cl.
  *G06F 15/18* (2006.01)
  *G06N 3/08* (2006.01)
  *G06F 17/30* (2006.01)

(52) U.S. Cl.
  CPC .......... *G06N 3/082* (2013.01); *G06F 17/30289* (2013.01)

(58) Field of Classification Search
  None
  See application file for complete search history.

(56) References Cited

U.S. PATENT DOCUMENTS

| 7,085,418 | B2 | 8/2006 | Kaneko et al. |
| 7,599,894 | B2 | 10/2009 | Owechko et al. |
| 7,787,474 | B2 | 8/2010 | Van Lunteren |
| 8,063,431 | B2 | 11/2011 | Ko |
| 8,756,183 | B1 * | 6/2014 | Daily et al. ..................... 706/20 |

OTHER PUBLICATIONS

Lukosevicius et al. "Reservoir Computing Approaches to Recurrent Neural Network Training", Computer Science Review, vol. 3, Issue 3, 2009, pp. 127-149.*

Joshua Baron, Karim El Defrawy, Kirill Minkovich, Rafail Ostovsky, and Eric Tressler, 5PM: Secure Pattern Matching Security and Cryptography for Networks. Lecture Notes in Computer Science, vol. 7485, pp. 222-240, 2012.

Office Action No. 1, for U.S. Appl. No. 13/358,095, mailed on Mar. 7, 2014.

Response to Office Action No. 1, for U.S. Appl. No. 13/358,095, filed Mar. 27, 2014.

(Continued)

*Primary Examiner* — Li-Wu Chang
(74) *Attorney, Agent, or Firm* — Tope-McKay & Associates

(57) ABSTRACT

Described is a system for searching a continuous data stream for exact matches with a priori stored data sequences. The system includes a neural network with an input and an output layer. The input layer has one neuron for each possible character or number in the data stream, and the output layer has one neuron for each stored pattern. Importantly, the delays of the connections from input to output layer are engineered to match the temporal occurrence of an input character within a stored sequence. Thus, if an input sequence has the proper time gaps between characters, matching a stored pattern, then the delayed neural signals result in a simultaneous activation at the receiving neuron, which indicates a detected pattern. For storing a pattern, only one connection for each pair of input character and output neuron has to be specified resulting in sparse coding and quick storage.

2 Claims, 11 Drawing Sheets

(56) References Cited

OTHER PUBLICATIONS

Erik Hjelmvik & Wolfgang John, "Statistical Protocol IDentification with SPID: Preliminary Results". SNCNW'09: 6th Swedish National Computer Networking Workshop, Uppsala, Sweden. May 4, 2009 <htttp://spid.sourceforge.net/sncnw09-hjelmvik_john-CR.pdf>.

Martin Roesch: Snort: Lightweight Intrusion Detection for Networks. LISA 1999 <http://gblp.dagstuhi.de/db/conf/lisa/lisa1999.html#Roesch99>: 229-238.

"Technical Details of 17-filter" 2006, website http://l7-filter.sourceforge.net/technicaldetails.

Khalife, J., Hajjar, A., & Diaz-Verdejo, J. (Nov. 2011). On the Performance of OpenDPI in identifying P2P Truncated Flows, In AP2PS 2011, The Third International Conference on Advances in P2P Systems (pp. 79-84).

N. Cascarano, A. Este, F. Gringoli, F. Risso, and L. Salgarelli, "An Experimental Evaluation of the Computational Cost of a DPI Traffic Classifier", Proc. GLOBECOM'09, 2009, pp. 1-8.

Sipser, Introduction to the Therapy of Computation, PWS, Boston. ISBN 0-534-94728-X. Section 1.1: Finite Automata, pp. 31-47, 1997.

A V Aho, M J Corasick, Efficient string matching: An aid to bibliographic search. Communications of the ACM, 18(6): 333-340, 1975.

eBayes TCP [Adaptive, Model-based Monitoring for Cyber Attack Detection, Keith Skinner & Alfonso Valdes, Lecture Notes in Computer Science, No. 1907, From Recent Advances in Intrusion Detection (RAID 2000). Edited by H. Debar and L. Me and F. Wu. Springer-Verlag, Toulouse, France, Oct. 2000, pp. 80-92.].

K. Koscher, A. Czeskis, F. Roesner, S. Patel, T. Kohno, S. Checkoway, D. McCoy, B. Kantor, D. Anderson, H. Shacham, S. Savage. Experimental Security Analysis of a Modern Automobile. The IEEE Symposium on Security and Privacy, Oakland, CA, May 16-19, 2010.

Michael Sipser, Introduction to the Theory of Computation. PWS, Boston. 1997, ISBN 0-534-94728-X, Section 1.1: Finite Automata, pp. 31-47.

T Kaneko, O Hori. Template matching method and image processing device. U.S. Pat. 7,085,418, 2006.

L. Di Stefano, S. Mattoccia, "A sufficient condition based on the Cauchy-Schwarz inequality for efficient Template Matching", IEEE Int. Conf. on Image Processing (ICIP 2003), Sep. 14-17, 2003, Barcelona, Spain.

L. G. Brown, "A survey of image registration techniques." ACM Comput. Surv., vol. 24, No. 4, pp. 325-376, 1992.

J. J. Hopfield, Neutral networks and physical systems with emergent collective computational abilities, Proceedings of the National Academy of Sciences of the USA, vol. 79, No. 8, pp. 2554-2558, Apr. 1982.

P Wang, A DeNunzio, P Okunieff, WG O'Dell, Lung metastases detection in CT images using 3D Template matching, Med. Phys. 34 (3), pp. 915, Mar. 2007.

Luigi di Stefano, Stefano Mattoccia, Federico Tombari, "An Algorithm for Efficient and Exhaustive Template Matching." Jan. 2004; In proceeding of Image Analysis and Recognition. International Conference, ICIAR 2004, Porto, Portugal, Sep. 29-Oct. 1, 2004, Proceedings, Part II.

R.S. Boyer, at al., "A fast string searching algorithm," Communications of the ACM, 20; 762-772, 1977.

M. Zubair, et al., "Text scanning approach for exact string matching," International Conference on Networking and Information Technology, 2010.

W. Maas, et al., "Real-time computing without stable states; a new framework for neural computation based on perturbations," Neural Computation 14(11); 2531-2560, 2002.

A. Waibel, et al., "Phoneme Recognition Using Time-Delay Neural Networks," IEEE Transactions on Acoustics, Speech, and Signal Porcessing, 37(3): 328-339, 1989.

J.L. Elman, "Finding structure in time," Cognitive Science, 14(2): 179-211. 1990.

E.M. Izhikevich, "Polychoniation: Computation with spikes," Neural Computation, 18(2): 245-282, 2006.

H. Pugam-Moisy, et al., "Delay learning and polychronization for reservoir computing," Neurocomputing, 71 (7-9): 1143-1158, 2008.

W. Maier, et al., "A Minimal Model for the Study of Polychronous Groups." arXiv:0806.1070v1 [Condensed Matter. Disordered Systems and Neural Networks], 2008.

Marina Blanton and Mehrdad Aliasgari. Secure outsourcing of dna searching via finite automata. In 24th annual IFIP WG 11.3 working conference on Data and applications security and privacy (DBSec'10), pp. 49-64, 2010.

Taher El Gamal. A public key cryptosystem and signature scheme based on discrete logarithms, In Proceedings of CRYPTO 84 on Advances in cryptology, pp. 10-18, New York, NY, USA, 1985, Springer-Verlag New York, Inc.

Ronald Cramer, Rosario Gennero, and Berry Schoenmakers. A secure and optimally efficient multi-authority election scheme. pp. 103-118. Springer-Verlag, 1997.

Ivan Damgård. Efficient concurrent zero-knowledge in the auxiliary string model. In Proceedings of the 19th international conference on Theory and application of cryptographic techniques, EUROCRYPT'00, pp. 418-430, Berlin, Heidelberg, 2000. Springer-Verlag.

Ivan Damgård and Mats Jurik. A generalisation, a simplification and some application of paillier's probabilistic public-key system. In Proceedings of the 4th International Workshop on Pradice and Theory in Oublic Key Cryptography: Public Key Cryptography, PKC '01, pp. 119-136, London, UK, 2001. Springer-Verlag.

Ivan Damgård and Claudio Orlandi. Multiparty computation for dishonest majority: from passive to active security at low cost. In Proceedings of the 30th annual conference on Advances in cryptology, CRYPTO'10, pp. 558-576, Berlin, Heidelberg, 2010. Springer-Verlag.

Jens Groth and Yuval Ishai. Sub-linear zero-knowledge argument for correctness of a shuffle. In Nigel Smart, editor, Advances in Cryptology—EUROCRYPT 2008, vol. 4965 of Lecture, Notes in Computer Science, pp. 379-396, Springer Berlin/ Heidelberg, 2008.

O. Goldreich. S. Micali, and A. Wigderson. How to play any mental game in Proceedings of the nineteenth annual ACM symposiurn on Theory of computing, STOC '87, pp. 218-229, New York, NY, USA, 1987, ACM.

Juan A. Garay, Philip MacKenzie, and Ke Yang. Strengthening zero-knowledge protocols using signatures. In Proceedings of the 22nd international conference on Theory and applications of cryptographic techniques, EUROCRYPT'03, pp. 177-194, Berlin, Heidelberg, 2003, Springer-Verlag.

Carmit Hazay, Rosario Gennaro, and Jeffery Sorensen, Automata evaluation and text search protocols with simulation based security. In Public Key Cryptography, pp. 145-160, 2010.

Heiko Hoffmann, Michael Howard, and Michael Daily Fast pattern matching with time-delayed neural networks. In International Joint Conference on Neural Networks (to appear), 2011.

Carmit Hazay and Yehuda Lindell. Efficient protocols for set intersection and pattern matching with security against malicious and covert adversaries. In Proceedings of the 5th conference on Theory of cryptography, TCC'08, pp. 155-175, Berlin, Heidelberg, 2006. Springer-Verlag.

Carmit Hazay and Tomas Toft, Computationally secure pattern matching in the presence of malicious adversaries. In ASIACRYPT, pp. 195-212, 2010.

Yuval Ishai, Manoj Prabhakaran, and Amit Sahai, Founding cryptography on oblivious transfer—efficiently. In Proceedings of the 28th Annual conference on Cryptology: Advances in Cryptology. CRYPTO 2008, pp. 572-591, Berlin, Heidelberg, 2008. Springer-Verlag.

Jonathan Katz and Lior Malka, Secure text processing with applications to private dna matching. In Proceedings of the 17th ACM conference on Computer and communications security. CCS '10, pp. 485-492, New York, NY, USA, 2010. ACM.

Knuth, Donald; Morris. James H., jr; Pratt, Vaughan (1977). "Fast pattern matching in strings". SIAM Journal on Computing 6(2): 323-350.

(56) References Cited

OTHER PUBLICATIONS

Richard M. Karp and Michael O. Rabin. Efficient randomized pattern-matching algorithms, IBM J. Res. Dev., 31:249-260, Mar. 1987.

K. Namjoshi and G. Narlikar. Robust and fast pattern matching for intrusion detection. In INFOCOM, 2010 Proceedings IEEE, pp. 1-9, Mar. 2010.

Pascal Paillier, Public-key cryptosystems based on composite degree residuosity classes, In Proceedings of the 17th international conference on Theory and application at cryptographic techniques, EUROCRYPT'99, pp. 223-238, 1999.

Torben P. Pedersen. Non-interactive and information-theoretic secure verifiable secret sharing. In Proceedings of the 11th Annual International Cryptology Conference on Advances in Cryptology, CRYPTO '91, pp. 129-140, London, UK, 1992, Springer-Verlag.

Structural joins: A primitive for efficient xml query pattern matching, In Proceedings of the 18th International Conference on Data Engineering, ICDE '02, pp. 141-, Washington, DS, USA, 2002 IEEE Computer Society.

Claus-Peter Schnorr, Efficient identification and signatures for smart cards, In Proceedings of the 9th Annual International Cryptology Conference on Advances in Cryptology, CRYPTO '89, pp. 239-252, London, UK, UK, 1990. Springer-Verlag.

Juan Ramón Troncoso-Pastoriza, Stefan Katzenbeisser, and Mehmet Celik. Privacy preserving error resilient dna searching through oblivious automata. In Proceedings of the 14th ACM conference on Computer and communications security, CCS'07, pp. 519-528, New York, NY, USA, 2007. ACM.

Tsung-Hsi Tsai, Average case analysis of the boyer-moore algorithm, Random Struct, Algorithms, 28:481-498, Jul. 2006.

Andrew C. Yao, Protocols for secure computations. In Proceedings of the 23rd Annual Symposium on Foundations of Computer Science, SFCS '82, pp. 160-164, Washington, DC, USA, 1982. IEEE Computer Society.

Andrew Chi-Chih Yao. How to generate and exchange secrets. In Proceedings of the 27ht Annual Symposium on Foundations of Computer Science, pp. 162-167, Washington, DC, USA, 1986. IEEE Computer Society.

\* cited by examiner

NEURAL NETWORK DEVICE WITH ENGINEERED DELAYS FOR PATTERN STORAGE AND MATCHING

PRIORITY CLAIM

This is a Divisional application of U.S. Non-Provisional application Ser. No. 13/358,095, filed on Jan. 25, 2012, entitled, "Neural Network Device with Engineered Delays for Pattern Storage and Matching," which is a Non-Provisional Application of U.S. Provisional Application No. 61/501,636, filed on Jun. 27, 2011 and entitled, "Neural Network Device with Engineered Delays for Pattern Storage and Matching."

BACKGROUND OF THE INVENTION (1) Technical Field

The present invention relates to a recognition system and, more particularly, to a neural network with engineered delays for pattern storage and matching.

(2) Description of Related Art

Pattern storage and matching is a rapidly evolving field that allows large databases to store and match digital data. A goal of the present invention is to improve the speed of pattern matching in digital data. Rapid search is needed in large data sets, like video and audio streams and internet traffic. For example, for intrusion detection in internet traffic, the state of the art is not fast enough to search for all known attack signatures at modern day internet router speeds.

For exact pattern matching, previous approaches focused on finding a string in a text. If wildcards are not allowed, then the Boyer-Moore (BM) algorithm implemented on a standard serial computer is still the state of the art (see Literature Reference Nos. 1 and 2). String search algorithms find matches of query strings within a text or input stream. The naive approach is to align the whole query string with the text starting from the beginning of the text and match each character in the query string with the corresponding character in the text. Then, the query string is shifted by one character and the matching process is repeated. This approach will find all matches in the text. However, the computational complexity is $O(k\,n)$, where k is query size and n is the text size (number of characters).

A more efficient approach is to shift the query string by k characters if a character is encountered that is absent in the query pattern, since any intermediate shifts are guaranteed to result in a mismatch with the query. This strategy is implemented in the BM algorithm (referenced above), which is still the gold standard for exact string matching without wildcards. The average computational complexity is $O(n/k)$ if the alphabet is sufficiently large, and the worst case computational complexity is $O(n)$. However, the shift strategy fails if the query string contains wildcards.

An alternative is a finite state machine (see Literature Reference Nos. 3 and 4), which can deal with wildcards in the query string. Currently, the state of the art are deterministic finite automata (DFA), particularly, the Aho-Corasick string matching algorithm (see Literature Reference No. 7), which is $O(n)$. This algorithm has been the standard method for more than 30 years. Finite automata search for strings by transitioning between states; this transition is regulated by the current input character. As preparation, a query string must be converted into a state machine, which can be time consuming. The Aho-Corasick algorithm extends the idea of finite automata to building a state machine that can search through several query patterns simultaneously. Theoretically, the speed is independent of pattern length and alphabet size (see Literature Reference No. 4). A disadvantage of DFA is that it requires an additional cost for building the state-transition table, which shows the state transitions depending on the input character, in preparation for the search. A state-transition table must be computed for every stored pattern that is to be matched against an input stream.

With respect to neural networks, the present invention employs a special case of time-delay neural networks (TDNN) (see Literature Reference No. 8). TDNNs are, however, conceptually different; instead of setting delays, in a TDNN the weight matrix of neural connections is expanded to include connections from previous time steps. Another instantiation of using delayed input can be found in recurrent neural networks, as, e.g., in the Elman network (see Literature Reference No. 9) which keeps a memory of previous hidden states.

In the context of recurrent networks, Izhikevich introduced the concept of polychronization (see Literature Reference No. 10). That is, time-shifted instead of simultaneous firing is critical for activating receiving neurons, because in real networks, connection delays are heterogeneous. Izhikevich demonstrated the phenomenon of polychronization in neural networks of spiking neurons that were described with several differential equations. Later, Paugam et al demonstrated a supervised learning approach to classify temporal patterns using a polychronous network (see Literature Reference No. 11). For this classification, they learned the delays between a layer of recurrently connected neurons and an output layer. Most other work set delays a priori.

All of the above neural models are computationally expensive. As a simpler alternative, Maier et al introduced the "minimal model" (see Literature Reference No. 12), which could exhibit polychronous activity without the complications of integrating differential equations.

Thus, a continuing need exists for a neural network device with engineered delays for pattern storage and matching that is based on the neuron model from the minimal model.

SUMMARY OF INVENTION

The present invention is directed to a neural network device with engineered delays for pattern storage and matching. The system includes a memory and one or more processors. The memory has instructions encoded thereon such that upon execution of the instructions, the processor perform an operation of generating a database of stored patterns, each stored pattern being a string of characters. The database is generated by performing operations of creating an output neuron for each stored pattern; creating a connection for each character in the stored pattern to the output neuron; setting a delay of the connection depending on an occurrence of each character in the stored pattern; and summing a number of connections for each stored pattern.

The present invention is also directed to a database of stored patterns. For example, the database is formed according to the steps listed above. Alternatively, the database includes a memory having stored therein a string of characters, the string of characters represented as a time sequence of neural activations such that each character corresponds to an input neuron with a connection to an output neuron that is assigned to the string of characters, wherein a time gap is stored as a delay for the connection between each input neuron and the output neuron.

The system also receives as an input a data stream in a neural network. The data stream has a string of characters and is received in the neural network such that at each time 1, only a single character is received, with each single character assigned to a neuron in the neural network. Thereafter, the neuron assigned to the single character is activated such that when active, the neuron fires to all connecting output neurons to form a neuron spike. Each neuron spike from the assigned neuron to a connecting output neuron has a delay, where each output neuron that receives a neuron spike sums its receiving neuron spikes to form an activation value. The activation value is compared against the number of connections for a stored pattern to generate a similarity match, such that if the similarity match exceeds a predetermined threshold, the string of characters in the input data stream is identified as the stored pattern.

Additionally, for each neuron, a connectivity array is generated such that a new connection is added for each character in the stored pattern. The connectivity array contains, for each connection, an identification number of a target neuron and a delay, where a number of connections per pattern equals a number k of characters in the stored pattern. Further, the activation of the output neurons is captured over time using a matrix that includes one dimension for each output neuron and one dimension for time.

In another aspect, the present invention is directed to a neural network device with engineered delays for pattern storage and matching. The device includes a field-programmable gate array (FPGA) that has input and output neurons. Each input and output neuron is a physical node on the FPGA, with physical connections between the nodes. Thus, in this aspect, the FPGA is operable for performing the operations listed above and herein.

Finally, the present invention is also directed to a method and computer program product. The method includes acts of causing a process to perform the operations described herein, while the computer program product includes computer-readable instructions stored on a non-transitory computer-readable medium that are executable by a computer for causing the computer to perform said operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
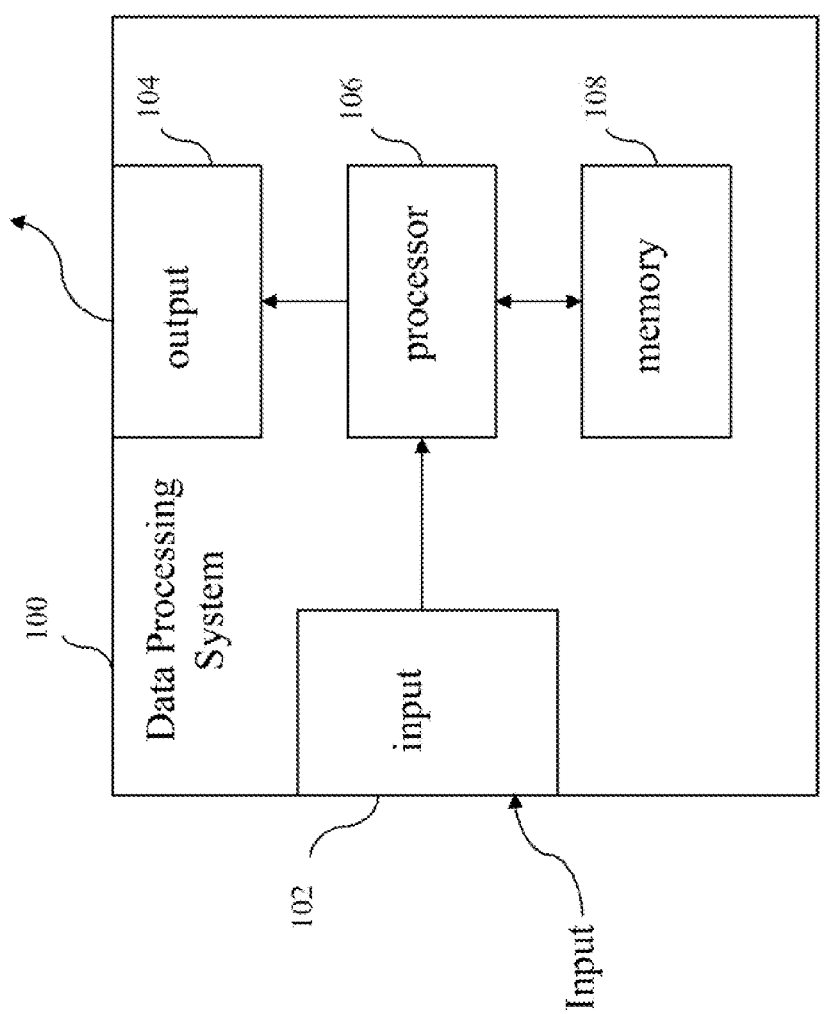
FIG. 1 is a block diagram depicting the components of a system of the present invention.

The present invention relates to a recognition system and, more particularly, to a neural network with engineered delays for pattern storage and matching. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Next, details of the present invention are provided to give an understanding of the specific aspects. Finally, a brief summary is provided.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

1. R S Boyer, J S Moore. *A fast siring searching algorithm*. Communications of the ACM, 20: 762-772, 1977.
2. M Zubair, F Wahab, I Hussain, M Ikram. *Text scanning approach for exact string matching*. International Conference on Networking and Information Technology, 2010.
3. A Gill. *Introduction to the Theory of Finite-state Machines*. McGraw-Hill, 1962.
4. M Sipser. *Introduction to the Theory of Computation*. PWS, Boston. ISBN 0-534-94728-X. Section 1.1: Finite Automata, pp. 31-47, 1997.
5. W Maass, T Natschlaeger, H Markram. *Real-time computing without stable states: a new framework for neural computation based on perturbations*. Neural Computation 14 (11): 2531-2560, 2002.
6. D Gusfield. *Algorithms on Strings, Trees and Sequences: Computer Science and Computational Biology*. Cambridge University Press, New York, USA, 1997.
7. A V Aho, M J Corasick. *Efficient string matching. An aid to bibliographic search*. Communications of the ACM, 18(6): 333-340, 1975.
8. A Waibel, T Hanazawa, G Hinton, K Shikano, K J Lang. *Phoneme Recognition Using Time-Delay Neural Networks*. IEEE Transactions on Acoustics, Speech, and Signal Processing, 37(3): 328-339, 1989.
9. J L Elman. *Finding structure in time*. Cognitive Science, 14(2): 179-211, 1990.
10. E M Izhikevich. *Polychronization: Computation with spikes*. Neural Computation, 18(2): 245-282, 2006.
11. H Paugam-Moisy, R Martinez, S Bengio. *Delay learning and polychronization for reservoir computing*. Neurocomputing, 71(7-9): 1143-1158, 2008.
12. W Maier, B Miller. *A Minimal Model for the Study of Polychronous Groups*. arXiv:0806.1070v1 [Condensed Matter. Disordered Systems and Neural Networks], 2008.

(2) PRINCIPAL ASPECTS

The present invention has three "principal" aspects. The first is a recognition system. The recognition system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e. computer operations coded into a computer chip). The "instructions" may be stored in the hard disk memory of a computer or on a non-transitory computer-readable medium such as a floppy disk, a CD-ROM, and a flash drive. These aspects will be described in more detail below.

A block diagram depicting the components of a recognition system of the present invention is provided in FIG. 1. The recognition system 100 comprises an input 102 for receiving information, such as a possible character or number in a data stream. Note that the input 102 may include multiple "ports." Although not limited thereto, input typically comes from a device or source such as a camera, microphone, or the internet. An output 104 is connected with the processor for providing an output matching pattern and/or information regarding a match to a user or to other systems in order that a network of computer systems may serve as a recognition system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
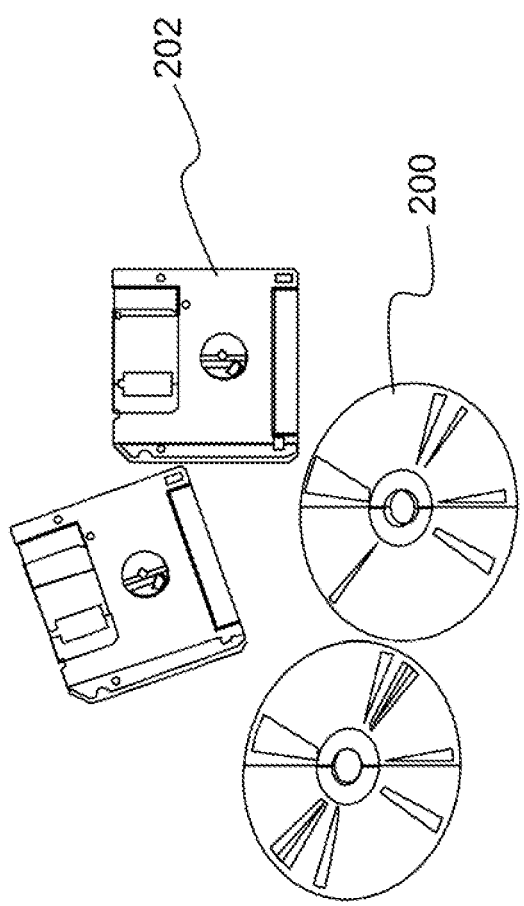
FIG. 2 is an illustration depicting a computer program product embodying the present invention.

An illustrative diagram of a computer program product embodying the present invention is depicted in FIG. 2. The computer program product is depicted as an optical disk 200 such as a CD or DVD, or a floppy disk 202. However, as mentioned previously, the computer program product generally represents computer-readable instructions stored on any compatible non-transitory computer-readable medium.

(3) INTRODUCTION

Generally speaking, the present invention is a recognition system. More specifically, the invention is directed to a neural network device with engineered connection delays for optimal pattern storage and matching. This paradigm is a shift from the common practice in which connection delays are either uniform across connections or set at random a priori (see liquid state machines as described in Literature Reference No. 5).

In operation, the invention searches a continuous data stream for exact matches with a priori stored data sequences. A unique element of the invention is a neural network with an input and an output layer. The input layer has one neuron for each possible character or number in the data stream, and the output layer has one neuron for each stored pattern. Importantly, the delays of the connections from the input layer to the output layer are engineered to match the temporal occurrence of an input character within a stored sequence. Thus, if an input sequence has the proper time gaps between characters, matching a stored pattern, then the delayed neural signals result in a simultaneous activation at the receiving neuron, which indicates a detected pattern. For storing a pattern, only one connection for each pair of input character and output neuron has to be specified resulting in sparse coding and quick storage.

The network is optimized to allow fast computation. Apart from keeping the number of computations at a minimum, the system only requires integer additions. An advantage of the present method is an improvement in recognition speed if the input characters come from a large set (large alphabet). Large alphabets are in use, e.g., in 16-Bit Unicode, image data, computational biology (see Literature Reference No. 7), and in languages like Chinese and Japanese. For alphabets with more than 1000 characters, implementation on a serial computer was found to have a more than two-fold improvement of recognition speed over the state of the art. Moreover, the network is suitable to be implemented in neural hardware, which results in higher speeds compared to a serial-computer implementation. Compared to state of the art pattern matching methods (Boyer-Moore algorithm and deterministic finite automata), the method has two further advantages: it does not require an upfront computational cost to compute shift or state-transition tables, and it can recognize partially-completed patterns as well (as an option).

(4) DETAILS OF THE INVENTION

As noted above, the present invention is generally directed to a recognition system. In operation, the system finds given character sequences within an input data stream. These data can be, e.g., visual, audio, LIDAR, or text. A character, for example, is an element of an alphabet, like, e.g., 16-bit Unicode. This element might be also expressed as a number. In a sequence of characters or numbers, the elements are separated by fixed time gaps. It is assumed that these gaps can be expressed as multiples of a fixed constant time step. A special case of the outlined problem is string matching in text, which is widespread in computer applications.

Figure 3:
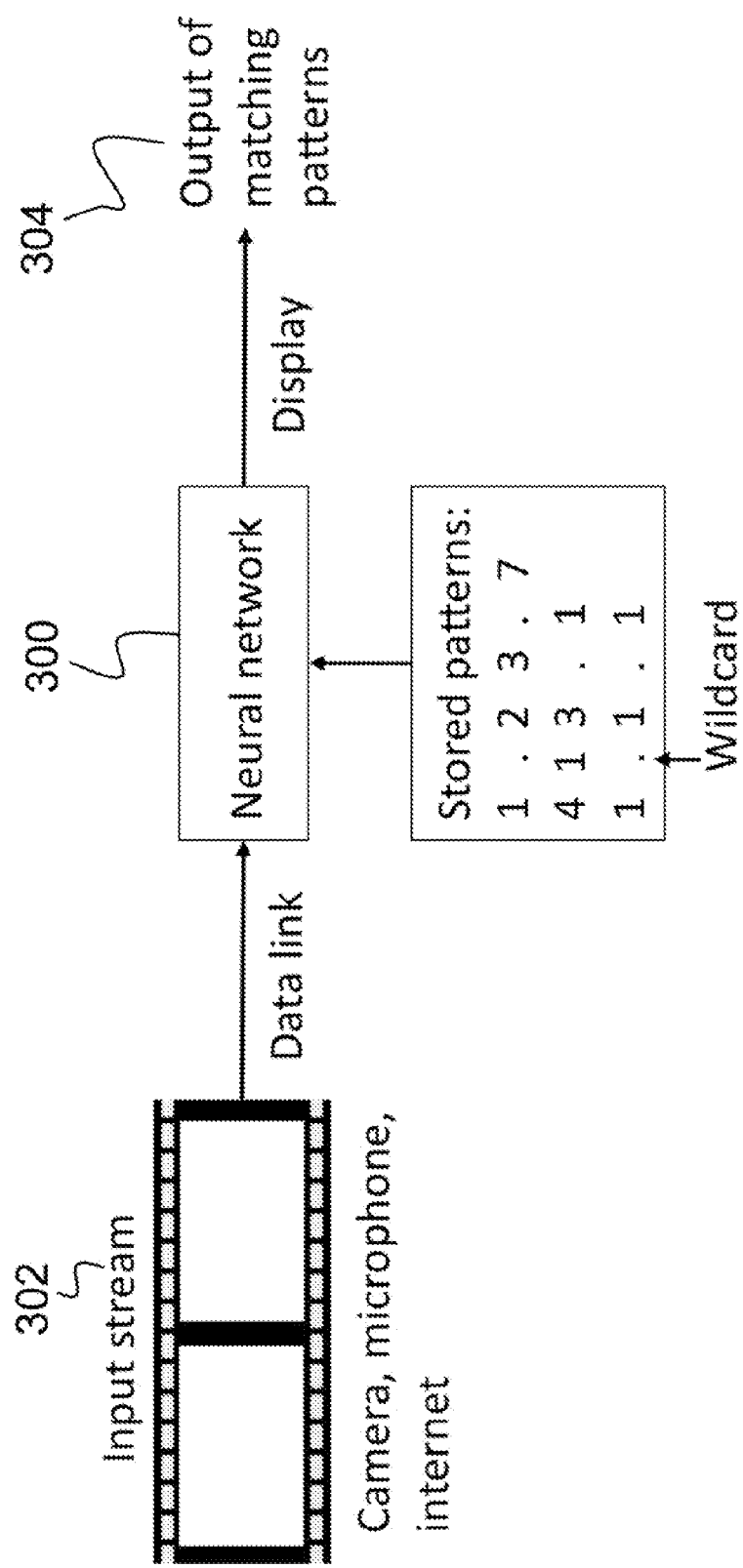
FIG. 3 is a flowchart depicting a data stream being preprocessed into a sequence of numbers, which form a continuous input into a neural network, with the network continuously outputting matches with stored patterns.

Key elements of the system are depicted in FIG. 3. As shown, the system includes a neural network 300, which can continuously process the input data 302 and output the detected patterns 304. The network 300 includes delays that are set to achieve exact pattern matching. As described herein, a pattern is a time series of neural activations. The following sections describe the graphic illustration of connection delays, polychronous activation, pattern storage and recall, storing multiple patterns, absence of false positives, partially complete patterns, and wildcards.

(4.1) Connection Delays

Figure 4:
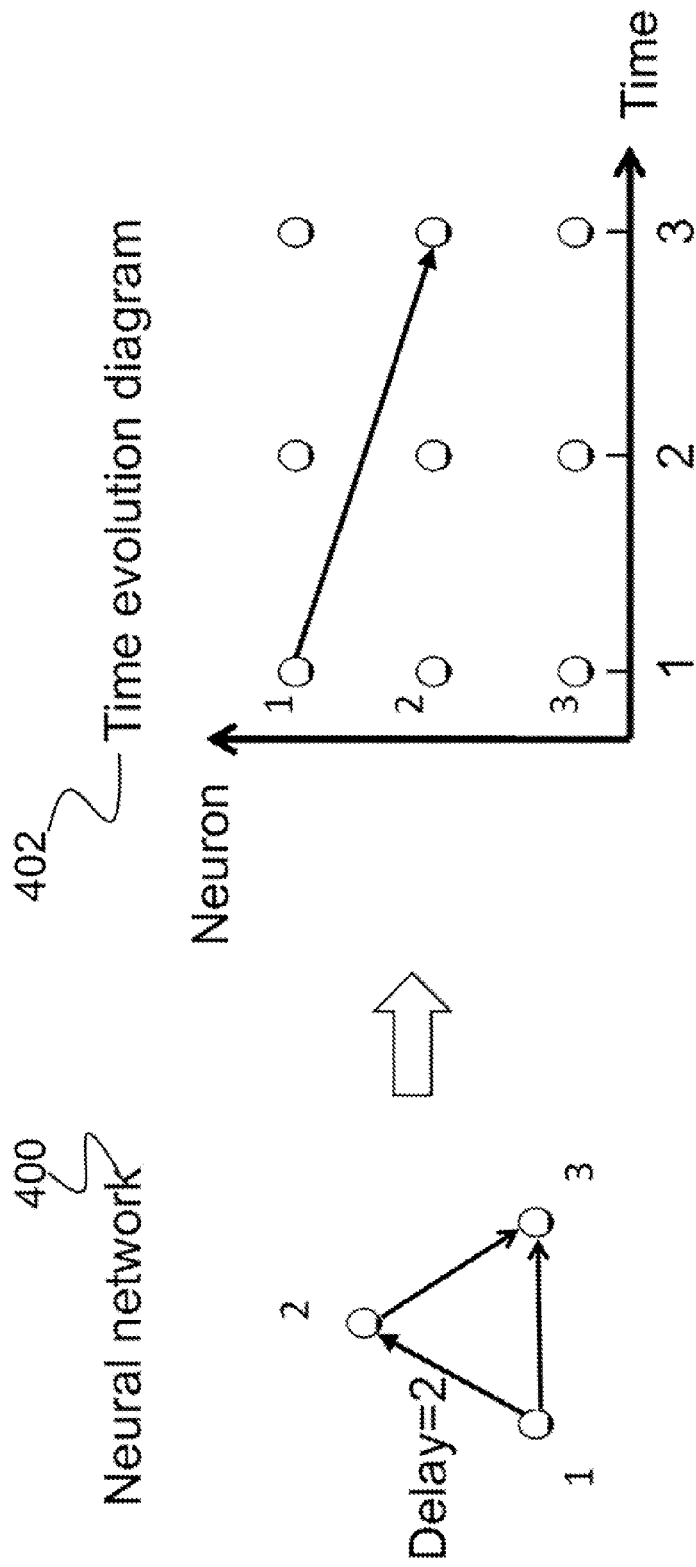
FIG. 4 is an illustration of a neural network and corresponding time-evolution diagram to graphically show connection delays, depicting an example of a two-time-step delay between neurons 1 and 2.

Central to the present invention is the setting of connection delays to achieve desired network functions. The network is defined through its neurons, the connections between them, and the delays for each connection. Throughout this specification, integer delays will be used. For example, FIG. 4 illustrates a neural network 400 that is represented in a time-evolution diagram 402 to graphically show connection delays. The figure shows an example of a two-time-step delay between neurons 1 and 2. To illustrate the delays between neurons graphically, all neurons for each time step are reproduced FIG. 4. In the resulting plot, a connection and its delay are depicted with a single arrow. More specifically, the time-evolution diagram 402 shows temporal connections between neurons (y-axis) at different time steps (x-axis).

(4.2) Polychronous Activation

The present invention employs a simple integrate and fire neural model. For example, if a neuron fires, it sends a spike with value +1 through all its outgoing connections. This spike is present only at a specific time step. Delayed through the connections, the spikes arrive at various time points at the receiving neurons. All incoming spikes that arrive at a receiving neuron at each time step are integrated and result at an activation value, a, which equals the number of incoming spikes at the specific time step, as follows:

$$a(t) = \sum_i s_i(t - \Delta t_i), \quad (1)$$

where $S_i$ is either 1 or 0 depending on the activity of the transmitting neuron i, and $\Delta t$ is the connection delay. If this activation value reaches a predetermined threshold, the receiving neuron fires. Each neuron may have its own threshold value.

Figure 5:
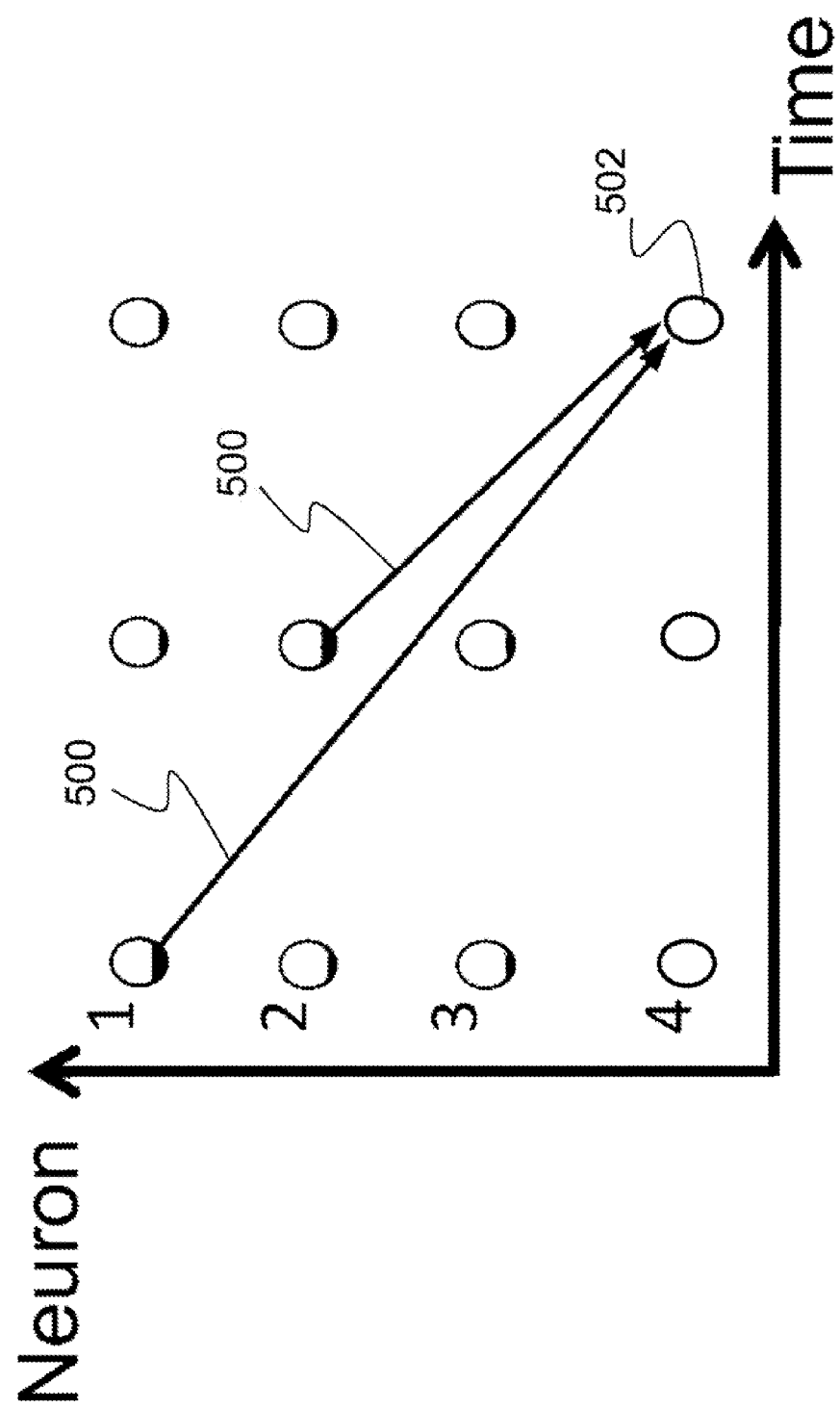
FIG. 5 is an illustration of synchronous incoming spikes at the receiving output neuron (#4) when neurons 1 and 2 are activated in turn, with arrows showing delayed transmissions through the neural connections.

The delays may vary between connections. Thus, to activate a receiving neuron, the transmitting neurons should fire asynchronously; they need to fire in a specific sequence that matches the delays in the connections, as shown in FIG. 5. Izhikevich termed this property polychronous activation (see Literature Reference No. 10). FIG. 5 is an illustration of a chart depicting synchronous incoming spikes 500 at the receiving output neuron 502 when neurons 1 and 2 are activated in turn. Arrows show delayed transmissions through the neural connections.

(4.3) Pattern Storage and Recall

To store a string (sequence) of characters, the string of characters can be represented as a time sequence of neural activations. Each character corresponds to an input neuron. Thus, the pattern is given as follows:

$$P = \{(s_1, t_1), (s_2, t_2), \ldots, (s_k, t_k)\}, \quad (2)$$

where $S_i$ is the input neuron, $t_i$ the time of activation of this neuron, and k the number of characters in the pattern.

To store this pattern, the time gap between each character in the pattern and the pattern's last character must be computed, as follows:

$$\Delta t_i = t_k - t_i, \quad (3)$$

Figure 6:
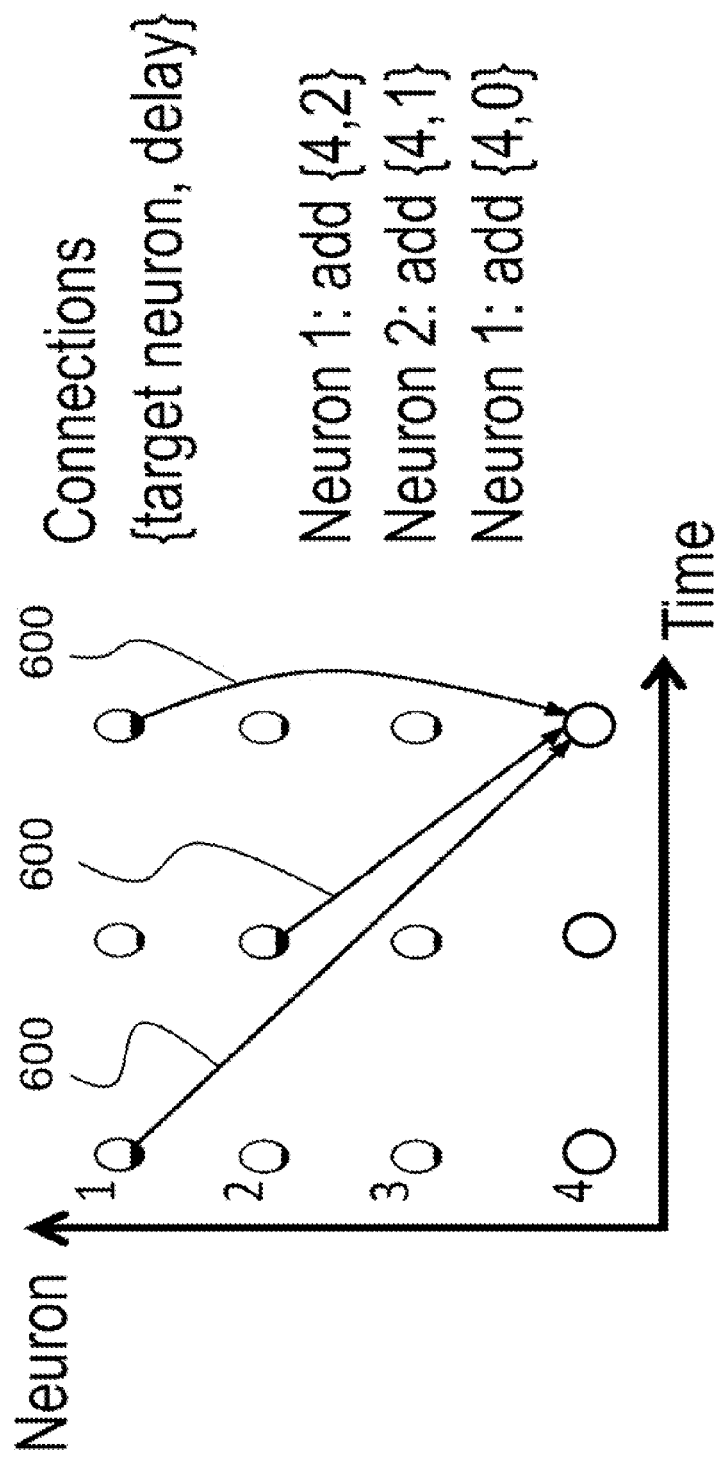
FIG. 6 is an illustration depicting an example of storing the pattern (1, 2, 1) into the network, showing three connections as added to the network.
Figure 7:
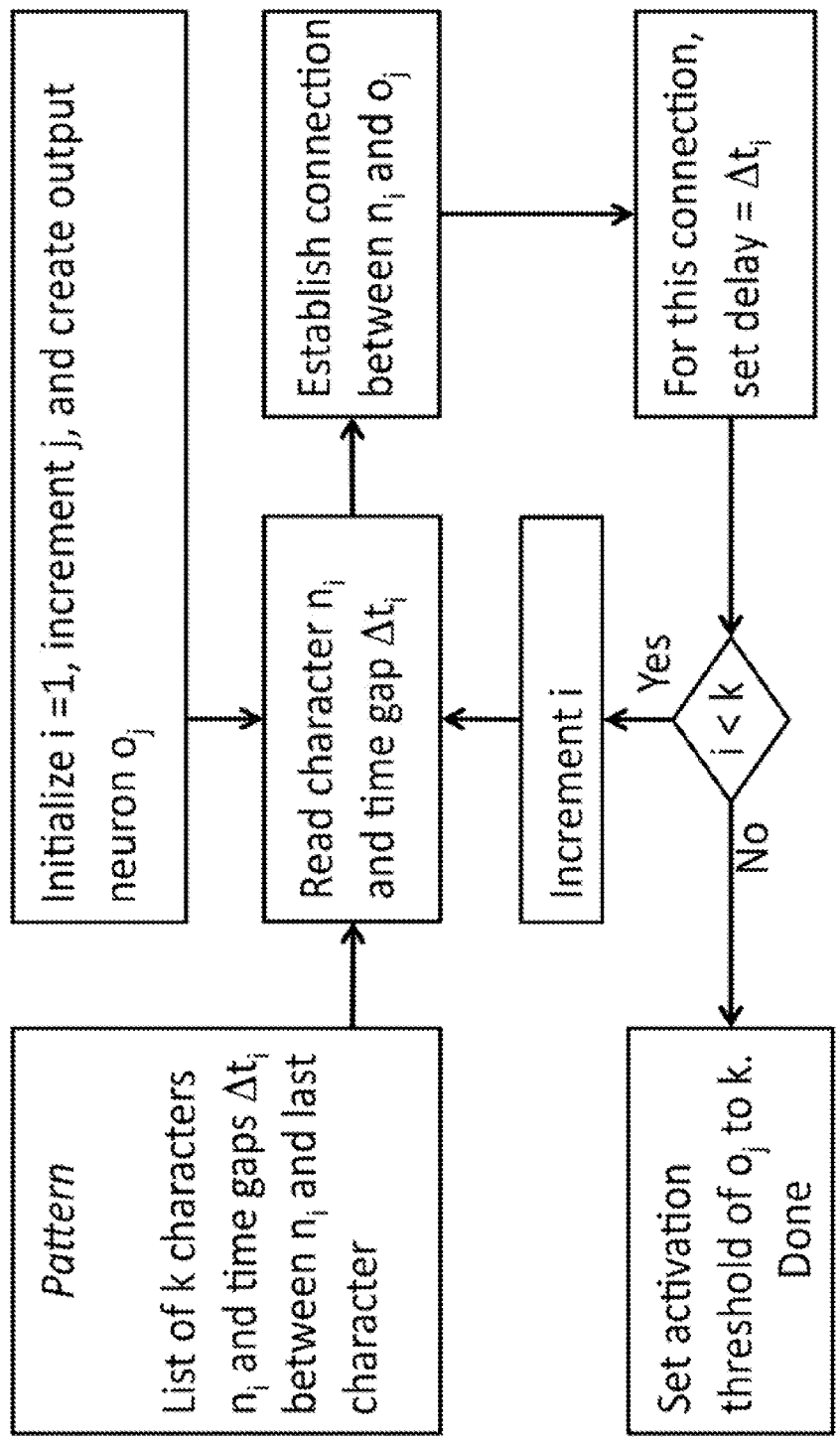
FIG. 7 is a flow chart depicting a process flow for storing a new pattern, where for each new pattern, an output neuron and connections to the output neuron are created.

This time gap is then stored as a delay in the network for the connection between the corresponding input neuron and a new output neuron that is assigned for this pattern, as depicted in FIGS. 6 and 7. FIG. 6 is a time-evolution diagram depicting an example of storing the pattern (1, 2, 1) into the network. As shown, three connections 600 are added to the network.

For each character, a new connection is formed. Multiple connections of variable delays are possible between two neurons. A connection is only created when a new pattern is stored. Thus, for large alphabets (many input neurons) the connectivity is sparse. Apart from building connections, the threshold of the output neuron is set to be equal to the pattern size k. This choice of neural delays and weights ensures that all occurrences of a pattern in an input stream are detected with the above operation and no false positives are obtained (see Section 4.5). For further understanding, the flow for storing a pattern is depicted in FIG. 7.

Figure 8:
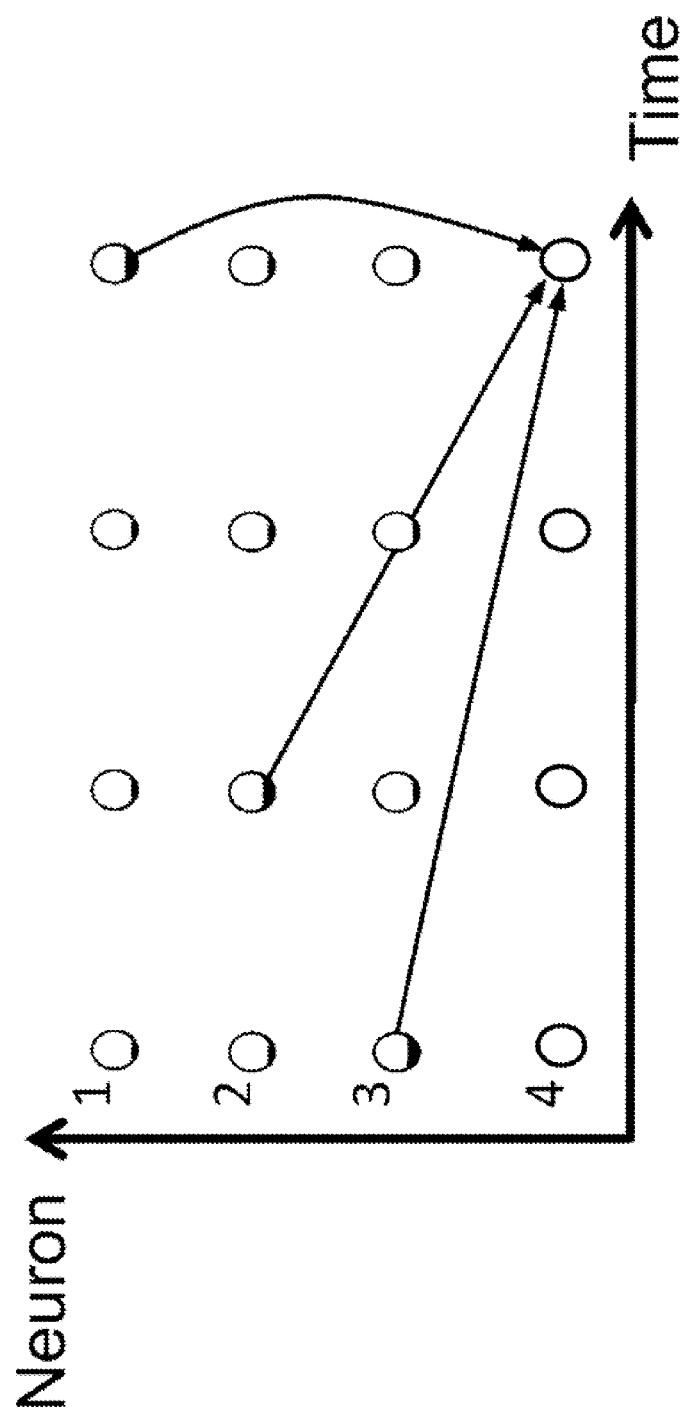
FIG. 8 is an illustration depicting storing a pattern with "?" wildcard (3, 2, ?, 1), illustrating that any neuron activated at time step 3 would be ignored.

A benefit of storing a string as delayed connections in the network is that wildcards of definite length are automatically taken care of, without increasing the computational complexity. FIG. 8 shows an example of storing a pattern with a single character wildcard "?", as (3, 2, ?, 1). In this example, any neuron activated at time step 3 would be ignored.

Such a wildcard is simply represented as a time gap, i.e., extra delays for the connections. For storing consecutive "?" wildcards, i.e., wildcards of a given length, the delays can be adjusted accordingly.

(4.4) Storing Multiple Patterns in One Network

Figure 9:
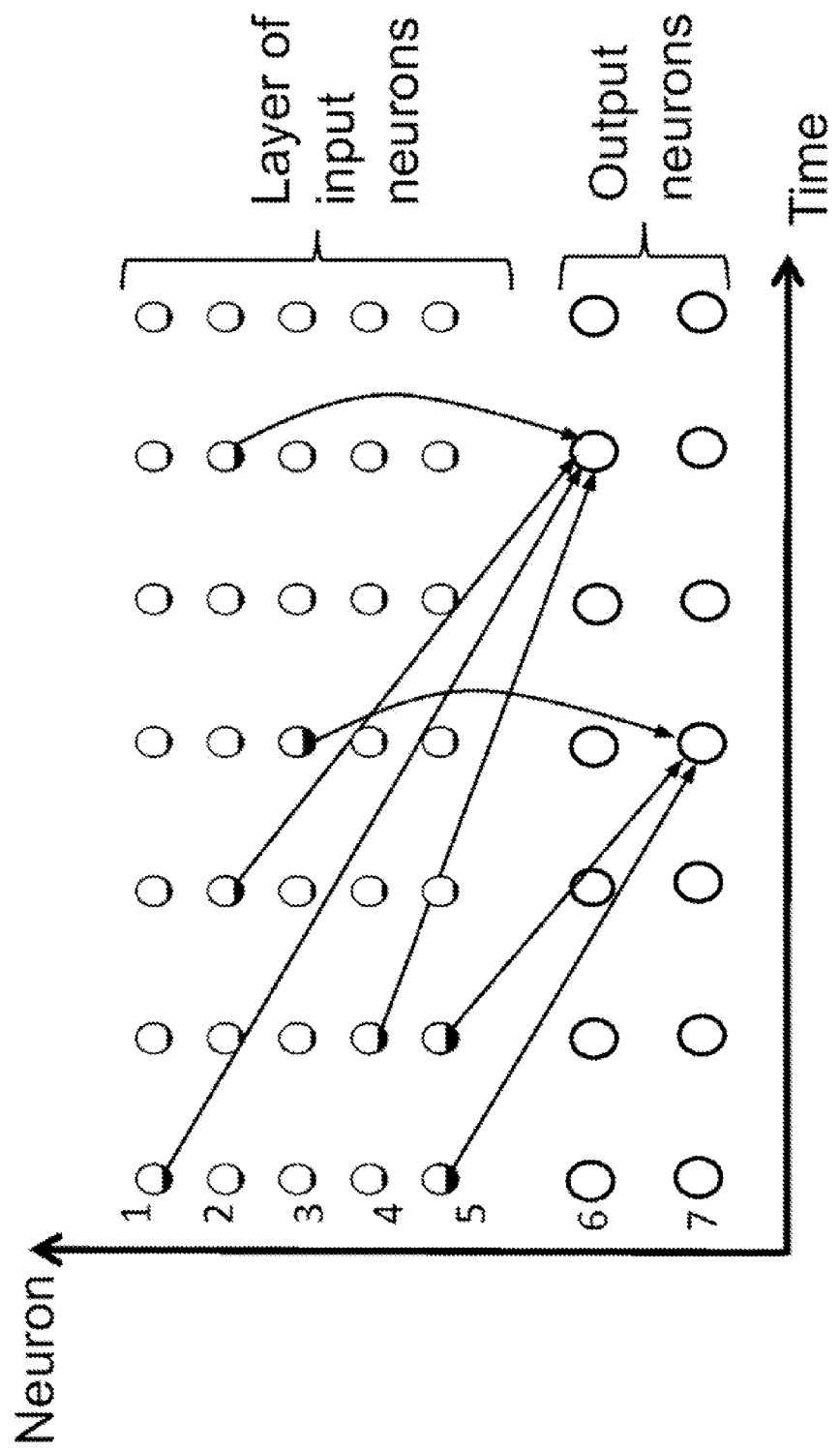
FIG. 9 is an illustration depicting an example of delayed connections of two stored patterns.

Multiple patterns can be stored in the same network. For each new pattern, a new output neuron is created and the above storage procedure is repeated. The network is capable of handling overlapping patterns, as depicted in FIG. 9. FIG. 9 illustrates an example of delayed connections of two stored patterns. In recall, multiple patterns can be detected simultaneously.

(4.5) Uniqueness of the Pattern Recall

Figure 10:
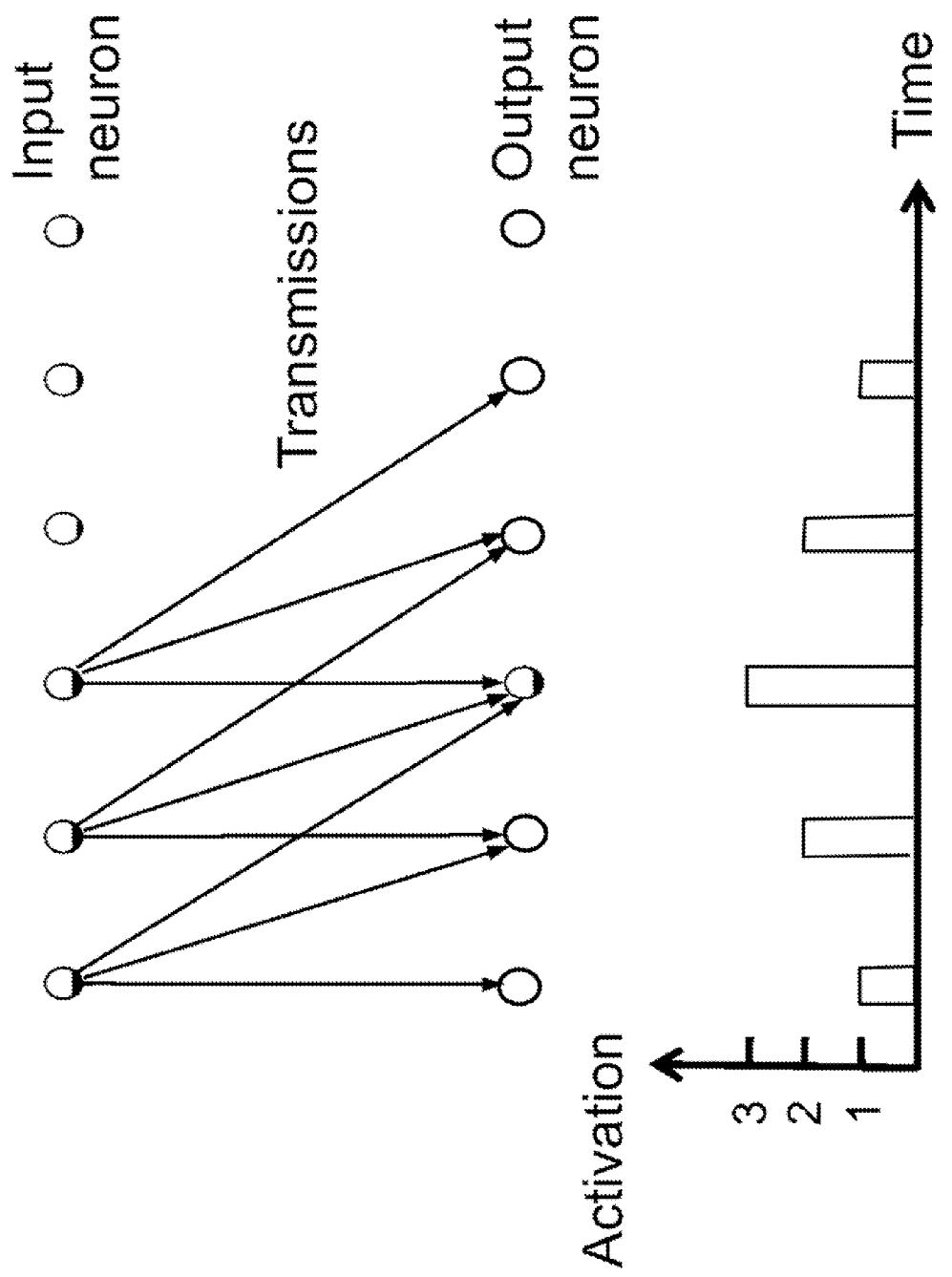
FIG. 10 is an illustration depicting network connections and activations for a pattern that repeats a character multiple times, here (1, 1, 1), with multiple connections being formed between the same input and output neurons.

The network detects all stored patterns in an input stream and does not produce any false positive, as is described below. Patterns of only a single character can be stored even though only two neurons are connected to each other, as shown in FIG. 10. Here, between the two neurons, multiple connections exist with different time delays. FIG. 10 depicts network connections and activations for a pattern that repeats a character multiple times, here (1, 1, 1). Multiple connections are formed between the same input and output neurons. However, only when the complete pattern is observed then the threshold for detection is reached.

As mentioned above, the network detects all occurrences of a pattern within an input stream without producing any false positive. To prove that there are no false positives, it is first noted that the threshold for activation equals the number of connections to one output neuron. Moreover, one connection activates the output neuron only at one time step. Thus, all connections have to be active to activate the output neuron. To activate all connections the input neurons have to fire at the time points as specified in the stored pattern. Therefore, an output neuron cannot become active if less than the complete pattern is present. Thus, false positives are absent.

(4.6) Partially Complete Patterns

The above method can be extended to detect partially complete patterns. Here, the threshold at an output neuron is reduced to a value smaller than k, allowing the network to detect partial matches with stored patterns. The value of the threshold regulates the completeness of the match. For example, if for a pattern of four characters a threshold of 2 is chosen, partial patterns are detected that consist of only two of the four characters that occur at the appropriate time points. This capability for partial matches allows the method to be applied to noisy patterns; noise in the input may activate the wrong neurons and therefore decrease the completeness of a pattern.

(4.7) Storing Patterns with "*" Wildcards

Figure 11:
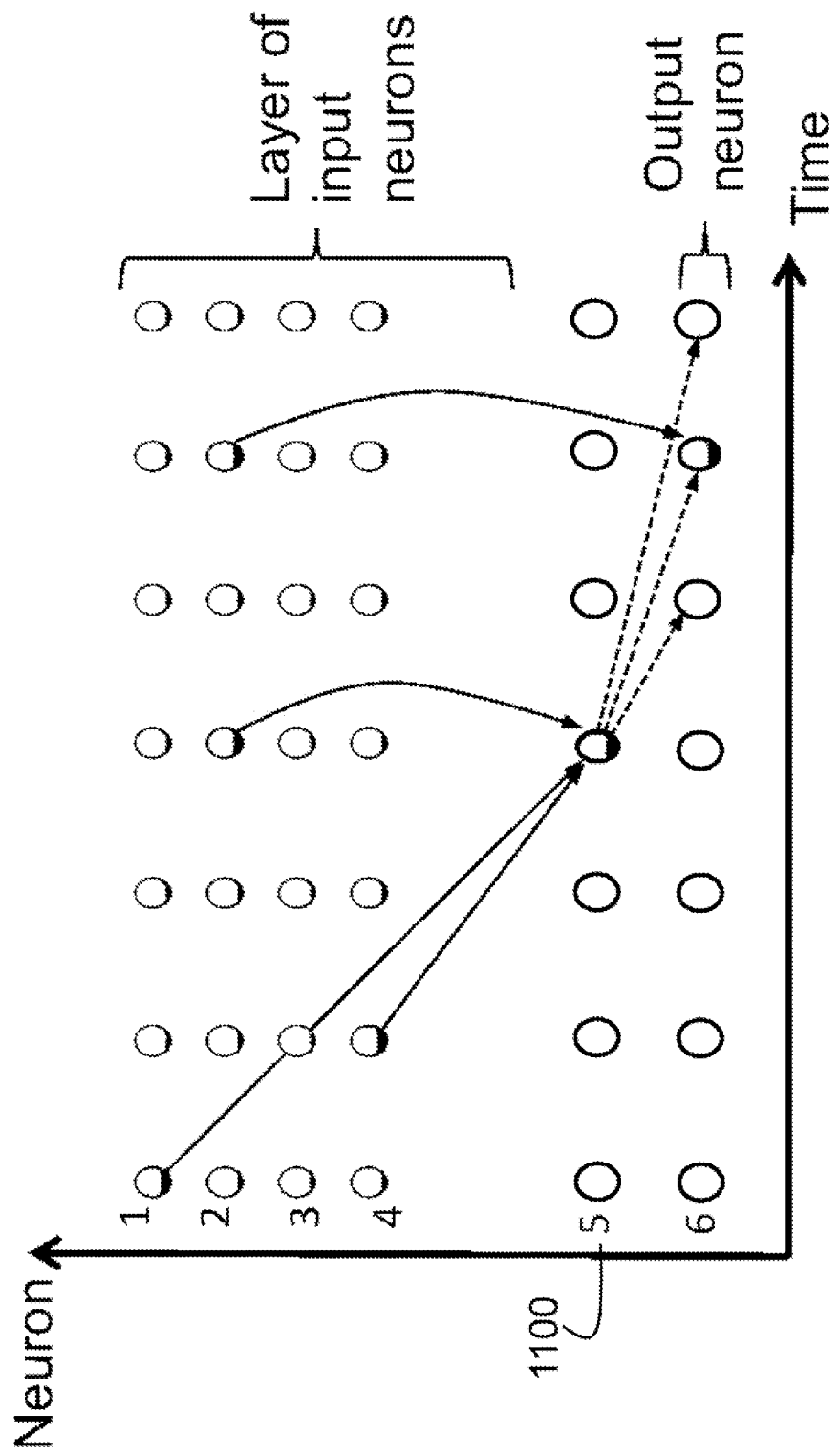
FIG. 11 is an illustration depicting an example for processing a pattern that includes a star wildcard (1, 4, ?, 2, *, 2), depicting the partial pattern before the "*" projecting onto an intermediate neuron (5), which in turn projects onto the output neuron.

As described above, the network can deal with the "?" wildcard in a straight forward way. Including the multiple-character "*" wildcard, however, requires a slight modification. In this modification and as shown in FIG. 11, an intermediate layer 1100 of neurons is added, one neuron for each wildcard in a pattern. FIG. 11 illustrates an example for processing a pattern that includes a star wildcard (1, 4, ?, 2, *, 2). The partial pattern before the "*" projects onto an intermediate neuron (5), which in turn projects onto the output neuron. These intermediate neurons either project to another intermediate neuron if another wildcard is present or project onto the output neuron (dashed arrows show projections). In both cases, the receiving neuron is activated over several time steps. Thus, this neuron remains in an excited state; i.e., only the remaining pattern is required to activate the neuron.

The threshold of an intermediate neuron equals the number of characters (not counting wildcards) up to the occurrence of the corresponding "*" wildcard. Thus, an intermediate neuron detects the partial pattern that is complete up to the "*" wildcard. When an intermediate neuron fires, it activates its receiving neuron by the same amount as the threshold of the intermediate neuron. Thus, the receiving neuron is excited equivalent to the reception of the partial pattern. An output neuron, as before, has a threshold equal to the size k of the complete pattern (not counting wildcards) and thus shows the same behavior as discussed before. Alternatively, as mentioned above, the threshold could be lowered to allow detection of partially complete patterns.

(4.8) Implementation

To implement the network on a serial computer, the following steps can be performed. First, a database of stored patterns needs to be generated. Each stored pattern is a sequence of characters. Generally speaking, the database is generated by creating an output neuron for each stored pattern; creating a connection for each character in the stored pattern to the output neuron; setting a delay of the connection depending on the occurrence of each character in the stored pattern; and summing a number of connections for each stored pattern. This process is provided in further detail below.

A list of connections is created. For each neuron, an array for the connections is built. A new connection is added for each character in a pattern. Here, only those input neurons that are actually used in a pattern are stored. The connectivity array contains, for each connection, the identification number of the target neuron and the delay. The number of connections per pattern equals the number k of characters in a pattern (not counting wildcards).

Second, for the output neurons, a matrix that captures their activation over time is stored: one dimension for the output neuron and one dimension for time. The stored patterns will have a maximum length (for the "*" wildcard a maximum length needs to be set). Thus, the time dimension of the matrix can be made periodic, and the matrix size in this dimension is the maximum duration of a pattern, $t_{max}$. That is, at each time step t, the time dimension of the matrix covers the steps t to $t+t_{max}-1$. The periodic boundaries require clearing the matrix contents to avoid spurious activations. After each input character is read into the network, the previous neural activations at time t are cleared, and then, t is incremented modulo $t_{max}$. As result, the space complexity (number of integer values) per stored pattern equals $t_{max}$ for the activation matrix plus 2 times the average k for the connectivity array.

In each computation cycle, an input neuron projects to all output neurons to which it is connected. For each connection, the delay in the connectivity array needs to be identified. Using this delay, the system shifts to the corresponding entry in the activation matrix and increments this entry by 1. For the "*" wildcard, the intermediate neurons are part of the activation matrix. If an intermediate neuron fires, it activates the row in the activation matrix that corresponds to the receiving neuron. The whole row is set to the value of the threshold of the intermediate neuron.

All required operations are either integer additions or comparisons. Thus, the method can be implemented very efficiently. The estimated computational complexity per pattern and input character equals 1+3 k/N additions, where N is the alphabet size. Here, k/N is the average number of connections per input neuron. For clearing the activation matrix, one addition is needed, and for each connection, three additions are needed: one to look up the delay, one to look up the entry in the activation matrix, and one to increment the entry in the activation matrix.

On a serial computer, the method's computation time is linear in the number of stored patterns. However, the speed can be improved through parallelization, which could be done straightforwardly, e.g., by splitting patterns over different processors, by distributing output neurons, connections to these neurons, and their entries in the activation matrix. Since each processor requires only simple computations, this process is very suitable for graphics chips (GPUs).

In addition, the network could be implemented on special neural hardware, reducing the cost of processing an input character to a single clock cycle. For example, the neural network can be implemented on a field-programmable gate array (FPGA). In this aspect, the FPGA includes input and output neurons, where each input and output neuron is a physical node on the FPGA. Physical connections exist between the nodes. The FPGA can be formed to include adjustable, trainable, or fixed weights and delays as described above.

For further understanding of a specific example of the present invention, provided below is a non-limiting example of source code that embodies the present invention. The source code was generated using MATLAB, as produced by Mathworks, Inc., located at 3 Apple Hill Drive, Natick, Mass. 01760-2098, United States. The example of source code is as follows:

```
% ----------------------------------------------------------------
% net = initNet(numNeuron)
% ----------------------------------------------------------------
% Call this function to initialize a new network
% numNeuron is the number of input neurons
% The function returns a data structure "net"
function net = initNet(numNeuron)
net.color = 0; % net.color is the total number of intermediate/output neurons.
% Initially, this number is zero, because no patterns are stored.
net.N = numNeuron;
for i = 1:numNeuron
    net.neuron(i).n = 0; % number of connections
end
% ----------------------------------------------------------------
% net = storePattern(net,sequence)
% ----------------------------------------------------------------
% This function stores pattern into a network given in the data structure "net".
% Pattern storage alters the network and the new network is returned as "net".
% "sequence" contains the pattern to be stored:
%    zeros in sequence are treated as wildcards ? or .
%    negative numbers are treated as wildcards * or .*
function net = storePattern(net,sequence)
k = nnz(find(sequence>0)); % find the number of elements larger than 0,
            % i.e., elements that are not wildcards
if k<2
    disp('Error: Pattern sequence must have at least two non-zero elements');
    return
end
% remove star wildcards at beginning of the sequence:
firstnum = 0;
for i = 1:length(sequence)
    if firstnum = = 0 && sequence(i)<0
        sequence(i) = 0;
    end
    if sequence(i)>0
        firstnum = 1;
    end
end
% get number of star wildcards:
numStars = nnz(find(sequence<0));
net.color = net.color+1; % increment number of intermediate/output neurons
tt = length(sequence);
net.output(net.color).threshold = k;
% the threshold of the output neuron is set to the number of elements in the stored
sequence
sumact = 0;
% We split the sequence into sections separated by * wildcards:
endPoints = zeros(numStars+1,1); % endPoints contains the locations before a * wildcard
or the end of the sequence.
endPoints(numStars+1) = tt; % end of sequence
countStar = 0;
% find locations of * wildcards:
for t = 1:tt
    n = sequence(t);
    if n<0% * wildcard
        countStar = countStar+1;
        endPoints(countStar) = t-1;
    end
end
countStar = 1;
% We build connections are between sequence elements and end points of a section
(marked by wildcards).
% Thresholds in the sections are set to the total number of elements up to the end of a
section.
for t = 1:tt % walk through the sequence
    n = sequence(t);
    if n>0
        ni = n;
        % add new connection:
        nc = net.neuron(ni).n+1;
        net.neuron(ni).n = nc;
        net. neuron(ni).connection(nc).delay = endPoints(countStar)-t;
        net.neuron(ni).connection(nc).color = net.color;
        net.output(net.color).connection = 0;
        sumact = sumact+1; % the activation level increases with each
element of the pattern sequence.
    else
        if n<0% wildcard *
            countStar = countStar+1;
            net.output(net.color).threshold = sumact;
```

```
            net.output(net.color).connection = net.color+1;
            net.color = net.color+1; % For each wildcard, we increase the number of
intermediate/output neurons. Each wildcard requires an intermediate neuron.
            net.output(net.color).threshold = k;
         end
      end
end
fprintf('Success. New pattern ID: % d\n',net.color); % Here, net.color marks the output
neuron
% ------------------------------------------------------------------
% avgcomp = detectSequence(net,inputSeq,displayResult)
% ------------------------------------------------------------------
% Tests a network "net"if its stored patterns are recognized in the
% sequence "inputSeq".
% If "displayResult = 1", the detection results for each time step are
% displayed on screen.
% "avgcomp"returns the number of computations per time step
% (i.e., per sequence element).
function avgcomp = detectSequence(net,inputSeq,displayResult)
max WClength = 100; % maximum length of sequence covered by a * wildcard
N = net.N; % number of neurons
maxD = zeros(N,1); % stores maximum delays between neurons
for i = 1:N
   if net.neuron(i).n>0
      maxD(i) = max([net.neuron(i).connection(:).delay])+max WClength;
   end
end
Dmax = round(max(maxD));
duration = length(inputSeq);
tmax = Dmax+1;
A = zeros(net.color,tmax); % activation matrix (cylindrical)
detect = zeros(1,duration); % array to record pattern detection
                % (1 = yes, 0 = no) for each time step
countcomp = 0;
if nargin>2 && displayResult == 0
   displ = 0;
else
   displ = 1;
end
for t = 1:duration % step through the input sequence
   n1 = inputSeq(t); % get element from the input sequence
   if n1>0%        element n1 activates input neuron n1
      for j = 1:net.neuron(n1).n % step through connections of n1
         ntarget = netneuron(n1).connection(j).color; % target of the connection
         d = net.neuron(n1).connection(j).delay; % connection delay
         td = t + d;
         td = mod(td-1,tmax)+1;
         A(ntarget,td) = A(ntarget,td)+1; % update the activation matrix
         countcomp = countcomp+1; % increment number of computations
         if A(ntarget,td)> = net.output(ntarget).threshold
            % if the target neuron is above threshold, we check if
            % this neuron projects to another a new target neuron
            newtarget = net.output(ntarget).connection;
            if newtarget == 0% if not, we have an output neuron and detected a pattern.
detect(t) = detect(t)+1;
            else % if yes, we raise the activation level of the new target neuron for all time
steps
               temp = A(newtarget,td);
               A(newtarget,:) = net.output(ntarget).threshold;
               A(newtarget,td) = temp;
            end
         end
      end
   end
   % clearing one column of activation matrix:
   t1 = mod(t-1,tmax)+1;
   A(:,t1) = zeros(net.color,1);
end
avgcomp = countcomp/duration;
if displ % display results
   fprintf('\n');
   disp('Input sequence:');
   disp(inputSeq);
   disp('Detection of known patterns:');
   disp(detect);
   fprintf('Average number of computations per time step: %0.2f\n\n',avgcomp);
end
fprintf('\nFound %d pattern(s)\n',sum(detect));
```

Finally, listed below is an non-limiting example of an execution of the code listed above:
>>net=initNet(10);
>>net=storePattern(net,[1 2 0 0 3]);
Success. New pattern ID: 1
>>detectSequence(net,[0 0 5 1 2 4 6 3 9])
Input sequence:
0 0 5 1 2 4 6 3 9
Detection of known patterns:
0 0 0 0 0 0 0 1 0
Average number of computations per time step: 0.33
Found 1 pattern(s)

(5) SUMMARY

The present invention is directed to a pattern matching system. In contrast to prior work on neural networks, the present invention uses set connection delays of a neural network to achieve a desired function. In doing so, the property of polychronous firing is exploited for detecting a time sequence. As a result, the system outperforms a 40-year-old established standard for pattern matching in the case of large alphabets. In addition, the method has several desired properties, particularly, the capability to deal with wildcards, to detect partially complete patterns, and to reduce the required computations to integer additions, i.e., no multiplications. The detection of partially complete patterns is beneficial if patterns are noisy, and a tolerance for detection is required.

Since pattern matching is widespread, the method has the potential to find many applications, particularly, in areas like cyber security.

What is claimed is:

1. A computer implemented method for forming a database of stored patterns, each stored pattern being string of characters, the method comprising an act of causing a computer having a processor to execute instructions encoded upon a memory, such that upon execution, the processor performs operations of:
    creating an output neuron for each stored pattern;
    creating a connection for each character in the stored pattern to the output neuron;
    setting a delay of the connection depending on a location of each character in the stored pattern; and
    summing a number of connections for each stored pattern.

2. A database of stored patterns in a memory, each stored pattern being a string of characters, the database comprising:
    an output neuron for each stored pattern;
    a connection for each character in the stored pattern, each connection having a delay depending on a location of each character in the stored pattern; and
    a string of characters stored in the memory, the string of characters represented as a time sequence of neural activations such that each character corresponds to an input neuron with a connection to an output neuron that is assigned to the string of characters, wherein a time gap is stored.

* * * * *